(12) United States Patent
Schäfer et al.

(10) Patent No.: US 6,698,555 B2
(45) Date of Patent: Mar. 2, 2004

(54) MOTOR VEHICLE PARKING BRAKE CONTROL DEVICE

(75) Inventors: Helmut Schäfer, Ketsch (DE); Bruno Hoess, Ottersweier (DE); Michael Poehlman, Charlotte, NC (US)

(73) Assignee: Deere & Company, Moline, IL (US)

(*) Notice: Subject to any disclaimer, the term of this patent is extended or adjusted under 35 U.S.C. 154(b) by 0 days.

(21) Appl. No.: 09/972,615

(22) Filed: Oct. 4, 2001

(65) Prior Publication Data

US 2002/0092720 A1 Jul. 18, 2002

(30) Foreign Application Priority Data

Oct. 19, 2000 (DE) .......................... 100 52 260

(51) Int. Cl.[7] .............................................. F16D 65/24
(52) U.S. Cl. .............................. 188/170; 303/3; 303/11; 303/15; 303/20
(58) Field of Search ................................ 303/3, 15, 20, 303/10, 11, 13, 89; 188/170, 300; 74/473.1, 473.36, 335; 192/219.5, 30 W

(56) References Cited

U.S. PATENT DOCUMENTS

| | | | | |
|---|---|---|---|---|
| 4,576,261 A | * | 3/1986 | Barr ........................ 192/219.5 |
| 4,763,959 A | * | 8/1988 | Vandemotter ................ 303/63 |
| 5,281,007 A | * | 1/1994 | Brainard ..................... 303/11 |
| 5,365,804 A | * | 11/1994 | Downs et al. ............... 74/535 |
| 5,370,449 A | | 12/1994 | Edelen et al. |
| 5,394,137 A | * | 2/1995 | Orschek ................. 188/1.11 E |
| 5,704,693 A | * | 1/1998 | Mackiewicz ................. 303/15 |
| 5,779,325 A | * | 7/1998 | Diesel ........................ 188/170 |
| 5,893,439 A | * | 4/1999 | Park ........................ 192/219.5 |
| 5,904,228 A | * | 5/1999 | Eike et al. ................... 188/170 |
| 5,964,335 A | * | 10/1999 | Taniguchi et al. ........ 192/219.5 |
| 5,984,425 A | * | 11/1999 | Orzal .......................... 188/170 |
| 6,250,433 B1 | * | 6/2001 | Sealine et al. ................. 188/69 |
| 6,305,511 B1 | * | 10/2001 | McCann et al. ......... 188/106 F |
| 6,382,741 B1 | * | 5/2002 | McCann et al. ............. 188/265 |
| 6,428,117 B1 | * | 8/2002 | Messersmith ........... 188/151 A |

FOREIGN PATENT DOCUMENTS

DE 41 27 991 C2 2/1993

* cited by examiner

*Primary Examiner*—Jack Lavinder
*Assistant Examiner*—Benjamin A Pezzlo

(57) ABSTRACT

A control device for the parking brake of a motor vehicle has a hydraulic cylinder with a piston chamber that can be pressurized by means of a valve arrangement, and has a hydraulic piston connected mechanically to engagement elements of the parking brake. The parking brake is forced into an engaged or disengaged position depending on the hydraulic pressure in the piston chamber. The piston chamber connects to a pressure sensor providing pressure signals that represent the state of the parking brake and that are evaluated by an electrical control unit. The control unit defines a first predetermined pressure threshold corresponding to the engaged state of the parking brake, and a second predetermined pressure threshold corresponding to the disengaged state of the parking brake.

7 Claims, 2 Drawing Sheets

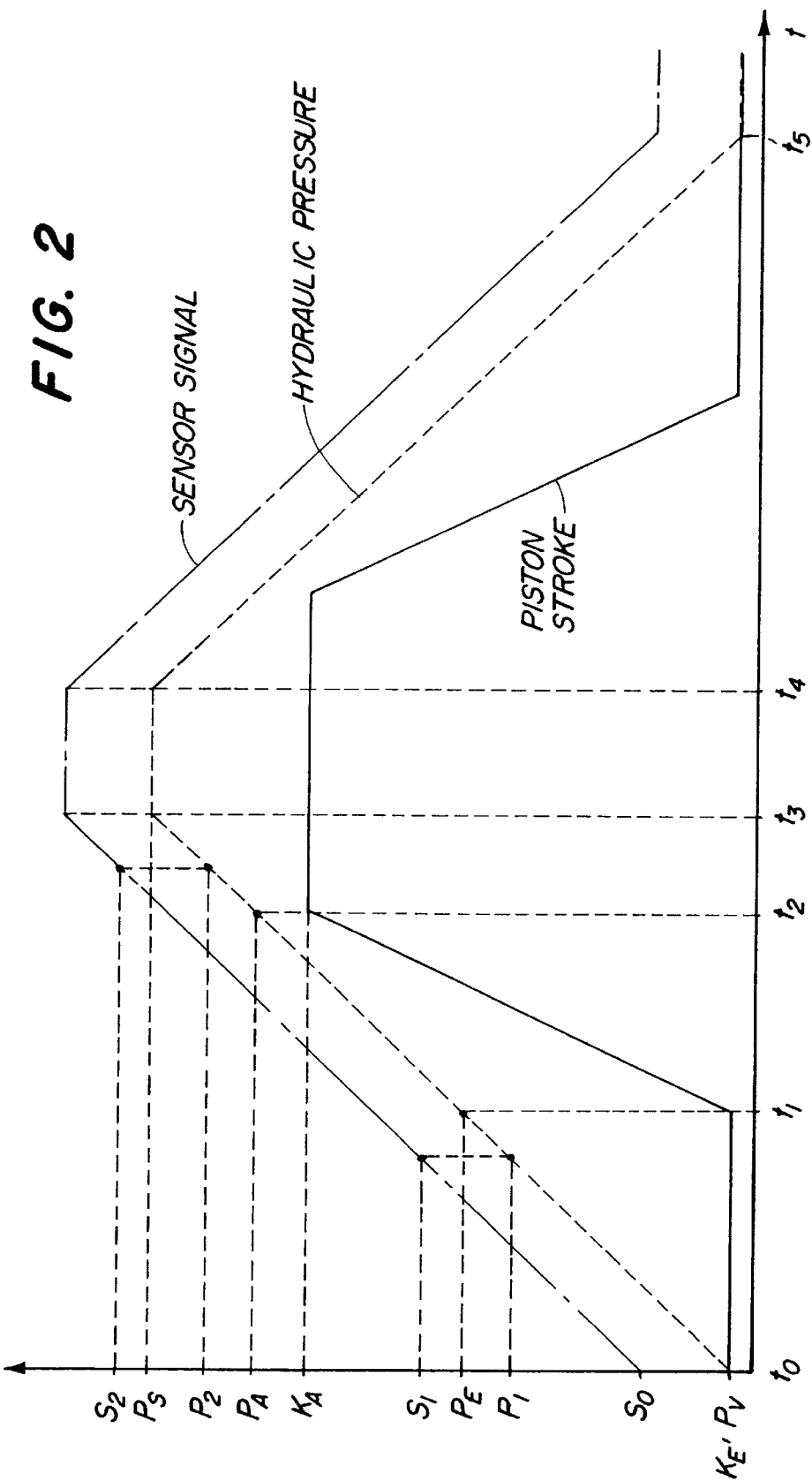

MOTOR VEHICLE PARKING BRAKE CONTROL DEVICE

BACKGROUND OF THE INVENTION

The present invention relates to a motor vehicle parking brake control device.

With today's vehicle transmissions (synchronized, power-shifting or automatic transmissions), the parking brake is typically set by means of a mechanical rod assembly that blocks rotational movement of the transmission gears or the vehicle wheels by means of positive fit. In connection with improving ease of use, gears have been configured with electrically actuated gear switches, so that the change gear command can be performed by the driver by means of a push-button. Such a servo control could also be used in connection with the parking brake. With the use of continuously variable speed transmissions, which can realize a non-positive stationary state by adjusting to a infinitely high transmission ratio, the transition from the non-positive stationary state into the park position (and vice versa) is done without interrupting the braking effect of the vehicle. Thus, a goal is have a parking brake (mechanical, positive-fit locking of a drive-side gear) which can be locked and unlocked by transmission of an electrical command.

Because the operational safety of the vehicle depends on the function of the parking brake to a very large degree, the construction and design should be operationally safe, that is to say, redundant. Above all, this concerns the reliable execution of driver wishes for locking or unlocking, and preventing accidental locking while driving and accidental unlocking in a stationary state (e.g., through loss of auxiliary power, short circuit in the power circuit, and the like). Therefore, the electrical control unit should provide a return notification about the current state of the parking brake at all times.

To recognize the parking brake state, at least the two end positions of the parking brake, "locked" and "unlocked," must be detected. Path sensors or end switches could be used, wherein they detect the position of the parking brake activation mechanism, and when each end position is reached, a contact is closed. However, because the activating mechanism end positions are strongly dependent on tolerances and wear, the corresponding signals cannot be triggered with sufficient accuracy. Reliability of path sensors can be adversely affected by abrupt movements of the activating mechanism. If an electrical parking brake is to be retrofitted, it is difficult to install path sensors or end switches into existing transmission housings without changing the existing transmission structure.

In general, the parking brake contains a detent with teeth that can engage the teeth of a gear of the drive train, so that a positive fit is produced and rotational movement of the drive train gear and thus movement of the vehicle is prevented. While engaging the parking brake from its disengaged position in the stationary state, sometimes, according to the teeth interval or the ratio of the tooth width to the gap width, the tip of a tooth of the detent can be positioned on the tip of a tooth of the gear. This tooth-on-tooth position prevents the entire mechanical activation chain from reaching its end position for the engaged position. However, an extremely small movement of the vehicle is sufficient to snap the detent into the next tooth gap. In the tooth-on-tooth position, a path sensor would not recognize that the locking position has been reached.

It is also conceivable to position a path sensor directly on the hydraulic piston in order to monitor the piston motion. However, this requires great expense in terms of construction because either pressure-tight or pressure-compensating implementations for contact switches or a complex rod assembly connecting to the hydraulic piston would be necessary.

U.S. Pat. No. 5,370,449 describes an electrically activated friction-fit parking brake, in which a pressure sensor is used to determine whether the brake is depressed (low pressure) or released (high pressure). As soon as the pressure sensor reports a high pressure, which corresponds to a released brake, the preselected transmission gear is set. However, no sensor signal is used for the transition region of the braking effect, that is, between total braking effect and the released state, so that this region remains undefined and there is uncertainty in the transmission control. Thus, there is the risk that the transmission could enter a non-positive engagement before the brake is released. Also, the brake could be released before the transmission is engaged, so that on a slope, a vehicle not in gear could roll uncontrollably. With the control of positive-fit parking brakes, other problems occur beyond those of non-positive parking brakes.

SUMMARY

Accordingly, an object of this invention is to provide a control device for the parking brake of a motor vehicle, by means of which the previously mentioned problems can be overcome.

A further object of the invention is to provide such a control device which is reliable and which enable vehicles to be equipped at a later time and in a simple way with an electrical control unit for a parking brake.

A further object of the invention is to provide such a control device which enables a freely selectable installation, has a simple construction, and is maintenance-friendly.

A further object of the invention is to provide such a control device which handles the system-dependent tooth-on-tooth position as a normal operating condition (engaged position) and enable diverse plausibility checks.

These and other objects are achieved by the present invention, wherein a control device for a parking brake includes at least one hydraulic cylinder and one pressure sensor that detects the pressure in the hydraulic cylinder directly or indirectly. The hydraulic piston of the hydraulic cylinder is connected mechanically to engagement elements of the parking brake, so that the parking brake is forced into an engaged or disengaged position in dependence on the hydraulic pressure. The pressure sensor outputs pressure signals that represent the state of the parking brake and that are evaluated by an electrical control unit. The pressure signals of the pressure sensor are evaluated relative to at least two predetermined pressure threshold values. A first pressure threshold value is defined to correspond to the engaged state of the parking brake. A second pressure threshold value, which is different from the first pressure threshold value, corresponds to the disengaged state of the parking brake. As a rule, the second pressure threshold value is greater than the first pressure threshold value.

The control or evaluation unit recognizes at least three pressure ranges: a lower pressure range, in which the parking brake is engaged, an upper pressure range, in which the parking brake is disengaged, and a middle transition range. An unambiguous return message about the instantaneous state of the parking brake activation is provided to the control device at all times. Signals are provided that enable a locking circuit to be designed so that the demands for high reliability are satisfied.

In connection with additionally available input signals, such as commands from the operator, output speed, solenoid valve voltage, ignition, engine speed, and the like, many different plausibility queries and error messages can be generated due to detection of the pressure range. The signals of the control and evaluation unit can be used for a return notification to the operator and/or for controlling the transmission. These can also be used to diagnose faults relative to hydraulic and/or electrical problems.

The pressure sensor can be mounted in a simple way directly to the piston chamber or to a channel that is connected to a connecting line running between the valve arrangement and the piston chamber of the hydraulic cylinder. Thus, the position to attach the pressure sensor can be freely selected. This permits a maintenance-friendly design that is simple in terms of construction. The electrical parking brake unit can also be retrofitted in a simple way. Preferably, a pressure sensor is chosen that is designed for the pressure pulses and pressure spikes of mobile hydraulics, and thus is adapted to rough operating conditions.

With application of the solution according to the invention, the tooth-on-tooth position mentioned above does not cause any problems because the control device recognizes, without any additional equipment, that the lower pressure threshold has been passed and that the parking brake has reached its engaged position.

The pressure sensor and the evaluation of at least two pressure thresholds enables an easy, reliable transition from the parked position to the driving position and vice versa in connection with continuously variable speed transmissions with a non-positive stationary state, without requiring the operator to perform a special engagement.

Setting of the pressure threshold values enables reliable vehicle operation. In particular, the transition range between an engaged and disengaged parking brake can be reliably recognized, so that faulty control of the vehicle transmission can be prevented. For example, during the transition from drive to park, the "non-positive stationary" state is maintained until the lower pressure threshold value has been passed.

In particular, in order to prevent problems that are connected with the tooth-on-tooth position described above, a preferred refinement of the invention is provided where the connection between the hydraulic piston and an activating mechanism for the parking brake is designed such that solely pressure forces are transmitted. For example, the activating mechanism contains an activating shaft that is connected to the hydraulic piston by means of a sliding connection. Normally, the activating shaft is pressed against the hydraulic piston by a main spring of the activating mechanism. In the case of an unpressurized cylinder and a tooth-on-tooth position, the hydraulic piston can assume its rest position while the activating mechanism is still extended, so that an intermediate space appears between the activating shaft and the hydraulic piston.

It is also an advantage to provide a compression spring that forces the hydraulic piston into its unpressurized position independent of the activating mechanism. If the activating rod assembly is blocked due to a tooth-on-tooth position, then the piston is returned due to lower pressure until it stops in the piston chamber under the action of the compression spring. First, the pressure in the piston chamber falls from a value, which can be derived from the spring force and the piston cross section, to zero or to the pressure level of the storage container. When it reaches the stop, the hydraulic piston allows setting of the parking brake. If a tooth gap becomes free due to a small movement of the vehicle, then the detent snaps directly and undamped into the gap.

Preferably, a main spring engages the activating mechanism of the parking brake, and this main spring forces the activating mechanism into its locked position and the hydraulic piston into its unpressurized position by means of an activating element.

Preferred refinements of the invention are focused on setting the first and second pressure thresholds. The first pressure threshold value depends on the design of the hydraulic piston and the action of at least one spring that forces the hydraulic piston into its unpressurized stop position against the hydraulic pressure generated by the valve arrangement. In the stop position, the spring exhibits a resting force that presses the hydraulic piston against a stop. The resting force of the spring is determined by its spring tension and corresponds to the hydraulic pressure in the piston chamber. The first pressure threshold is set so that it corresponds to a value between zero and the mentioned spring tension. That is, the first pressure threshold lies between the pressure zero and the pressure created in the piston chamber at the time at which the hydraulic piston moving into its unpressurized position has just reached its stop position.

For an engaged parking brake, the piston chamber is unpressurized. Bearing in mind economical batch production of a pressure sensor for which limited resolution in the range of smaller pressures is permitted, the lower threshold should be advantageously selected to be as large as possible. On the other hand, in the case of a tooth-on-tooth position, the piston chamber pressure should first pass below the lower pressure threshold value when the hydraulic piston has reached its stop in the piston chamber. Thus, it is advantageous to set the first pressure threshold so that it is clearly greater than zero and lies only slightly below the pressure value corresponding to the spring tension.

In order to guarantee sufficient allowance for reliability on either side, an advantageous design of the invention provides that the first pressure threshold be set to a value of 40% to 80% of the pressure value corresponding to the spring tension.

The second pressure threshold value preferably depends on the design of the hydraulic piston and the action of at least one spring, and lies between the spring pressure that corresponds to the spring force in the maximum disengaged position of the hydraulic piston and the hydraulic system pressure provided by the valve arrangement. Preferably, the second pressure threshold corresponds to a value of 60% to 90% of the power supply pressure or system pressure.

Preferably, the pressure sensor is an analog sensor and each voltage value of the output signal corresponds to the pressure in the piston chamber.

If the pressure value measured by the sensor is outside of the typical range, in other words, it is less than zero or greater than the value corresponding to the system or supply pressure, then the evaluation electronics determines that there is a defective pressure sensor. Advantageously, the pressure sensor can also include the possibility of diagnosing purely electrical errors, by means of which, e.g., a power interruption can be recognized. Here, an advantageous refinement of the invention is proposed because the voltage output signal of the pressure sensor is already greater than zero in the unpressurized state.

BRIEF DESCRIPTION OF THE DRAWINGS

FIG. 2 is a time diagram for uniform application of pressure and subsequent removal of pressure of the piston chamber of the parking brake hydraulic cylinder.

DETAILED DESCRIPTION

Figure 1:
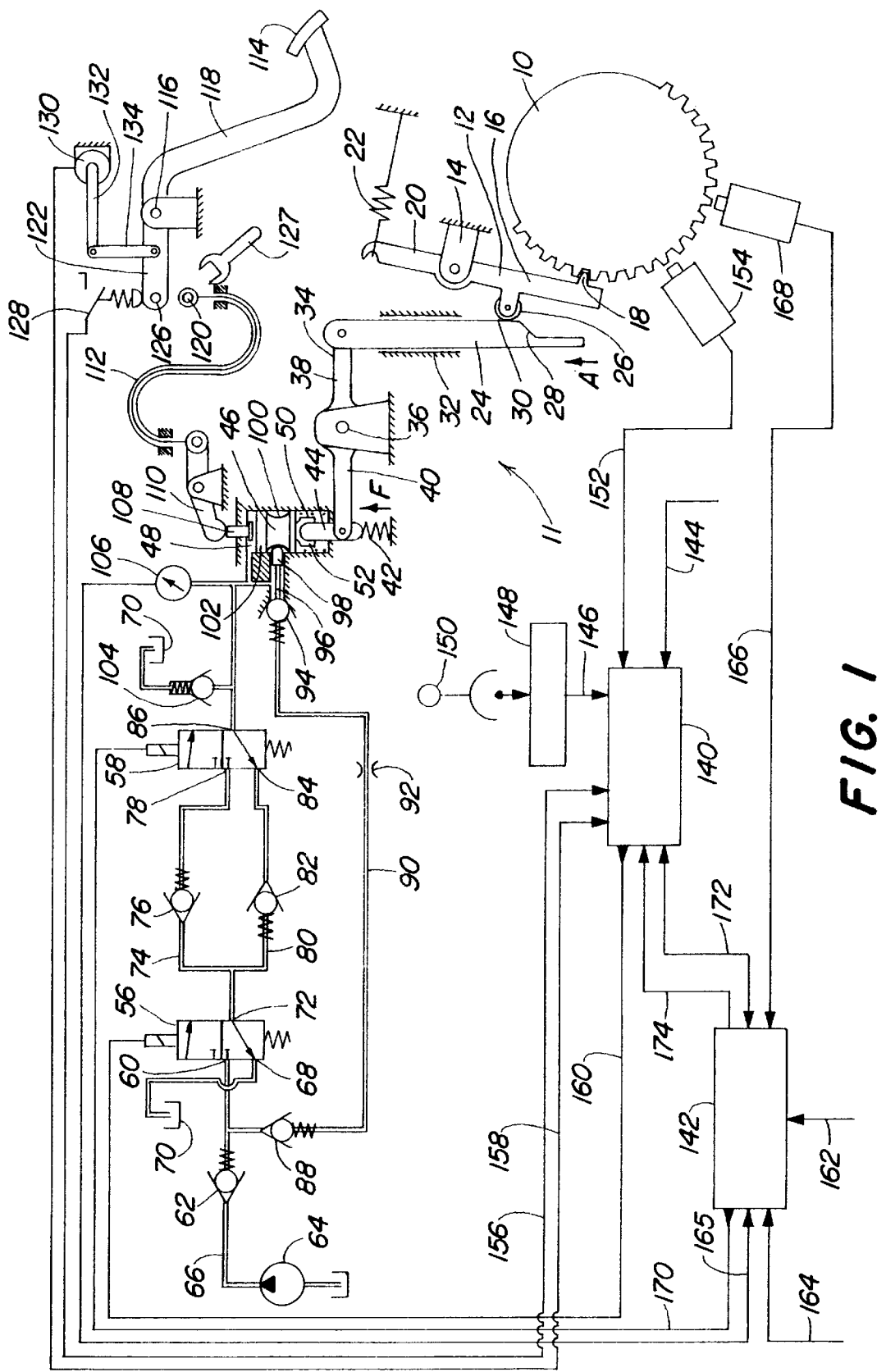
FIG. 1 is a schematic diagram of an electrical parking brake with hydraulic and electrical control circuits and with a control device according to the invention.

FIG. 1 shows a control device which can be used with a parking brake of a tractor. An output gear 10 of the vehicle transmission can be recognized, and this output gear is connected so that its rotation is united with that of the not-illustrated driven axles and wheels of the tractor.

A mechanical locking device 11 includes a rocker-like detent 12 that is supported, by means of a holder 14, on a transmission housing (not shown) or vehicle chassis so that it can pivot. A first arm 16 of the detent 12 carries teeth 18. By pivoting the detent 12, the teeth 18 of the detent 12 can engage the teeth of the output gear 10 so that a positive fit is produced and rotation of the output gear 10, and thus, movement of the vehicle, is prevented. The teeth geometry is formed with a repelling force, so that the detent 12 can also be reliably detached from engagement with the output gear 10 under maximum loads (vehicle weight, slope, traction coefficient, etc.). A return spring 22 engages the second arm 20 of the detent 12 to cause a reliable return of the detent 12 to its rest position, in which its teeth 18 does not engage the teeth of the output gear 10, as long as no further mechanical forces are applied to the detent 12.

The locking device 11 can further contain a spring-pretensioned activating shaft, whose front side features an activating cam. By rotating the activating shaft, the activating cam engages a detent 12 by means of a friction-reducing roller, and causes the detent 12 to pivot. Such a design is known and is used, such as for John Deere 6610 series tractors. For better understanding, a movable bar 24 is shown at the position of the activating shaft. The bar 24 features on one side a diagonal ramp (cam) that causes the detent 12 to pivot by means of a friction-reducing roller 26 mounted on first arm 16 of the detent 12. The ramp has a region 28 with a steep slope that is within the pivoting region of the detent 12, and a region 30 with a flat slope that is within the engaged region (park position) of the detent 12, and the feedback of high vehicle-side loads on actuation is minimized. By moving the bar 24 in arrow direction A, the detent 12 is moved into its disengaged position, and by a reverse force against the arrow direction A, it is moved into its engaged park position, in which the region 30 with the flatter slope engages the roller 26 (as shown).

The bar 24 guided in a guide 32 is articulated on a first arm 34 of a beam 38 that can pivot about a fixed axis of rotation 36. A main spring 42 engages the second arm 40 of the beam 38, exerts a force in arrow direction F, and forces the bar 24 against the arrow direction A into the illustrated, engaged position. In contrast to previous manual activation techniques, the locking device 11, in the absence of any additional input of force, assumes its locked (engaged) position (default position). This guarantees a reliable vehicle state if there is loss of auxiliary power.

The activating shaft 44 of a hydraulic activating piston 46 further engages the second arm 40 of the beam 38 in an articulated manner. The piston 46 is movably received by a housing hole and bounded at its end facing away from the activating shaft 44 by a piston chamber 48. A compression spring 50 forces the piston 46 in the direction of piston chamber 48. The activating shaft 44 is not rigidly fixed to the piston 46. Instead, a sliding connection 52 is provided between the two components, and this sliding connection permits the transfer of pressure forces but does not permit the transfer of tension forces.

If the piston chamber 48 is placed under pressure, the piston 46 moves downwards against the force of the compression spring 50 and presses on the beam 38 by means of the activating shaft 44, and this beam moves against the force of the main spring 42 and moves the bar 24 upwards. Thus, the roller 26 travels from the region 30 with the flat slope into the region 28 with the steep slope and releases the detent 12 which is pivoted by the force of the return spring 22 into its disengaged position.

If the pressure force created in the piston chamber 48 is switched off due to an engagement signal, then the piston 46 reacts directly. It is pushed upwards by the compression spring 50 and presses the volume of fluid out of the piston chamber 48. Due to the sliding connection 52 between piston 46 and activating shaft 44, the piston 46 moves independently of whether the mechanical components of the locking device 11 follow the piston motion.

The configuration of the described sliding connection 52 is particularly advantageous when, at the instant of an engagement signal, the teeth of the detent 18 is positioned on the teeth of the output gear 10 (tooth on tooth), so that at first an interconnection between the teeth is not possible. The components of the locking device 11, in particular the beam 38 and the activating shaft 44, then cannot assume their engaged position. Independently, however, the piston 46 is pushed upwards by the force of the compression spring 50 and empties the piston chamber 48, which can take a small amount of time due to throughput resistances (dependent on the oil viscosity) of the hydraulic components that control the piston chamber 48. Then, if engagement of the teeth is achieved through rotation of the output gear 10, the components of the locking device 11 can abruptly snap back without loss of time, without the engagement motion being damped by hydraulic throughput resistances and the like. A quick tooth engagement is desirable in order to prevent the output gear 10 from achieving a high velocity with strong acceleration, making tooth engagement more difficult or no longer possible because of great relative motion between the teeth.

Flow control of the pressure medium into and out of the piston chamber 48 is achieved by two 3/2-way solenoid valves 56, 58 that convert electrical commands into hydraulic commands. The first input 60 of the first solenoid valve 56, with interposition of a spring-loaded input non-check valve 62, is connected to pressure supply line 66 that is supplied with pressure from a pressure source 64. The input non-return valve 62 prevents a backwards flow of the pressure medium from the first solenoid valve 56 to the pressure supply line 66. It opens when the pressure in the pressure supply line 66 overcomes a counterforce generated by a spring of the input non-return valve 62. The pressure source 64 can be a hydraulic pump and typical means for pressure regulation, which, in particular, also supply other tractor loads, although this is not shown.

A second input 68 of the first solenoid valve 56 is connected directly to a storage container 70 or oil pan. With electrical voltage applied the output 72 of the first solenoid valve 56 is connected to the first input 60, and in the non-powered state (as shown), it is connected to the second input 68.

The output 72 of the first solenoid valve 56 is connected through a first connecting line 74, in which a first non-return valve 76 is arranged, to a first input 78 of the second solenoid valve 58, and through a second connecting line 80, in which a second non-return valve 82 is arranged, to a second input 84 of the second solenoid valve 58. The first non-return valve 76 is spring-loaded and arranged so that it prevents a backwards flow from the second solenoid valve 58 to the first solenoid valve 56. The second non-return valve 82 is spring-loaded and arranged so that it prevents an inflow to the second solenoid valve 58 from the first solenoid valve 56.

With electrical voltage applied to the second solenoid valve 58, the second solenoid valve output is connected to the first input 78, and in the second solenoid valve 58 non-powered state, to the second input 84 (as shown). The output 86 of the second solenoid valve 58 is connected to the piston chamber 48.

The piston chamber 48 is also connected via another valve arrangement to the pressure supply line 66, and this is done via the input non-return valve 62, a pressure-maintaining non-return valve 88, a connecting line 90, in which there is a throttle 92 limiting the throughput, and a leakage compensation valve 94. The pressure-maintaining non-return valve 88 is spring-loaded, and prevents a backwards flow of fluid from the piston chamber 48 to the pressure supply line 66. The leakage compensation valve 94 is a spring-loaded non-return valve that normally prevents fluid inflow to the piston chamber 48, and that can be opened by a connecting element influenced by piston 46. The connecting element contains a control pin 96, whose head 98 engages an annular groove 100 of the piston 46 as long as the piston 46 is in its unpressurized rest position (as shown). In this position of the control pin 96, the leakage compensation valve 94 is closed. When the piston 46 moves downwards due to an increase in pressure in the piston chamber 48, the control pin 96 is pushed out of the annular groove 100 and rides on the rim 102 of the piston 46 facing the piston chamber 48. In this way, the control pin 96 moves and opens the leakage compensation valve 94, wherein a connection between the pressure supply line 66 and the piston chamber 48 is created. However, the pressure medium flow is limited by the throttle 92 and is solely sufficient to compensate for the leakage loss. If the piston chamber 48 is connected via the solenoid valves 56, 58 to the unpressurized storage container 70, then the pressure in the piston chamber 48 decreases, the piston 46 moves upwards, the control pin 96 slides into the annular groove 100, and the leakage compensation valve 94 closes by means of its spring force, so that the piston chamber 48 is disconnected from the pressure supply line 66.

The piston chamber 48 is connected via a discharge valve 104 to the storage container 70. If the piston chamber 48 is depressurized, then the discharge valve 104, which is configured like a non-return valve, is opened by spring force. Thus, a certain amount of leakage fluid can be carried off by the discharge valve 104, if the parking brake is engaged by depressurized piston chamber 48. If the two solenoid valves 56, 58 are turned on, and thus the connection from the pressure supply 64 to the piston chamber 48 is created, then the discharge valve 104 is closed by the force of the fluid flow, so that then the pressure in the piston chamber 48 rises and the parking brake is disengaged.

The pressure of the piston chamber 48 is detected by a pressure sensor 106 and converted into electrical signals. The pressure signal output from the pressure sensor 106 essentially reproduces the corresponding position of the piston 46 and thus also the position of the locking device 11.

The parking brake can be disengaged by means of a manually activated mechanical emergency activation device for the parking brake, if there is a failure, e.g., by a loss of electrical or hydraulic power. Emergency activation can be required, e.g., for towing a vehicle. The emergency activating device engages the piston 46 and is controlled by a control rod assembly or Bowden cables from the vehicle cabin, and it can be activated there by the operator via suitable levers or pedals. For towing, this operation must be locked from the cabin. The mechanical parking brake is created so that the normal motions of the parking brake mechanism described above lead to no movement of the emergency activation device. This is guaranteed by means of appropriate slack or free-running functions.

The emergency activating device includes an activating pin 108 that acts on the end face of the piston 46 and that can be activated by means of a deflection lever 110 and Bowden cable 112. Passage of the activating pin 108 outwards from the piston chamber 48 is sealed by suitable means. Stroke movements of the piston 46 for engaging and disengaging the parking brake are not transmitted to the activating pin shown in the rest position.

A clutch pedal 114 of the vehicle is attached to a pedal lever 118 mounted on a stationary pivot pin 116. The clutch pedal 114 can be used for emergency activation of the parking brake, while the upper end 120 of the Bowden cable 112 is connected to the free end 122 of the pedal lever 118. Here, for example, a hole of the Bowden cable 112 is placed over a bolt 126 projecting from the free end 122 of the pedal lever 118 and fastened, if necessary. A tool 127 can be used for placement and fastening.

To activate the clutch pedal 114, the suspended end 120 of the Bowden cable 112 is pulled upwards. In this way the deflection lever 110 pivots and presses the activating bolt 108 downwards, so that the piston 46 pulls the bar 24 upwards via the beam 40, so that the roller 26 of the detent 12 arrives in the region 28 with the steep slope, and the detent 12 is moved by the return spring 22 from its engaged position (shown) into its disengaged position. By removing the force from the clutch pedal 114, the pedal lever 118 assumes its illustrated rest position, into which it is forced by a typical clutch pedal return spring. By means of the force of the main spring 42, the beam 38 pushes the bar 24 downwards, so that the roller 26 arrives in the region 30 with a flat slope and the detent 12 is pressed into its engaged position.

Thus, during a towing process, the clutch pedal 114 does not have to be continuously activated, and this pedal can be locked into the activated position by suitable means. This is achieved, e.g., through a locking bolt, not-shown, that secures the pedal lever 118 relative to the vehicle chassis.

The position of the pedal lever 118 is detected by an electrical position sensor 130 that is connected to the free end 122 of the pedal lever 118 and that outputs an analog electrical signal corresponding to each position of the pedal lever 118. Thus, it can be a rotary potentiometer connected to the pivot pin 116. In the embodiment illustrated, a rotary potentiometer 130 is shown as the position sensor, and it is connected via a rotary arm 132 and a shackle 134 to the free end 122 of the pedal lever 118.

For reasons of redundancy, there is a position switch 128 that is also connected to the free end 122 of the pedal lever 118. If the clutch pedal 114 is not activated and the pedal lever 118 is in its rest position, then the position switch 128 is open. It closes as soon as the clutch pedal 114 is completely depressed. By using the clutch pedal 114 for emergency activation of the parking brake, the output signal of the position switch 128 (closed position) indicates whether the parking brake has been released.

In particular, for vehicles with continuously variable speed drive, the position of the clutch pedal is often monitored, via position sensors or position switches, by a transmission control, in order to automatically switch the transmission to neutral as soon as the clutch pedal 114 is activated. It is advantageous to use these already provided components for emergency activation. The use of clutch pedal 118 for emergency activation is also advantageous because high forces can be transmitted to the locking device 11 by means of foot activation, so that the force of the main spring 42 can be effortlessly overcome.

An electronic main control unit, or transmission control unit, 140, and a secondary control unit, or parking brake control unit, 142, controls the two solenoid valves 56, 58. The main control unit 140 connects, via the line 144, to the not-illustrated ignition key switch of the vehicle, as well as via the line 146 to a vehicle control 148 which for its part detects the position of an operating lever 150. The main control 140 receives signals over the line 152 from a first rotational speed sensor 154 that detects the rotational speed of the output gear 10, as well as signals over the lines 156 and 158 from the position switch 128 and from the rotary potentiometer 130 which detect the position of the clutch pedal 114. The main control unit 140 controls the first solenoid valve 56 by means of the line 160.

The secondary control unit 142 connects directly to the not-illustrated vehicle battery by means of the line 162. In addition, it is connected via the line 164 to the ignition key switch. The secondary control unit 142 receives signals over the line 165 from the pressure sensor 106, as well as signals over the line 166 from a second rotational speed sensor 168 that detects the rotational speed of the output gear 10 independently of the first rotational speed sensor 154. The secondary control unit 142 controls the second solenoid valve 58 by means of the line 170. The main control unit 140 and the secondary control unit 142 exchange data with each other by means of a CAN bus 172. For reasons of redundancy, the secondary control unit 142 reports the rotational speed detected by the second rotational speed sensor 168 to the main control unit 140 over a line 174.

The main control unit 140 sends signals to the solenoid valves 56, 58 for engaging the parking brake (no current) or disengaging it (current). The command comes either from the operator via the operating lever 150, the vehicle control 148 and the line 146, or it results from safety-related variables processed in the main control unit 140. The command for engaging or disengaging the parking brake is conveyed from the main control unit 140 directly to the first solenoid valve 56, and indirectly, via the line 174 and the secondary control unit 142, which performs additional tests, to the second solenoid valve 58.

If both solenoid valves 56, 58 are without current, then the valve position shown in the drawing is achieved in which the piston chamber 48 is connected to the storage container 70 via the second solenoid valve 58, the second non-return valve 82, and the first solenoid valve 56. Thus, the piston 46 is in its upper position due to the force of the compression spring 50, and the locking device 11 is forced into the engaged position shown by the main spring 42. The discharge valve 104 is opened by its spring and likewise allows a direct pressure qualization between the piston chamber 48 and the storage container 70.

With an unpowered first solenoid valve 56, if just the second solenoid valve 58 is powered, then the latter switches and connects its first input 78 to its output 86. However, because the first solenoid valve 56 blocks inflow from the pressure supply, the lines 74 and 80 are connected afterwards, as before, to the storage container, and because furthermore the discharge valve 104 remains open, this does not change the position of the piston 46.

With an unpowered second solenoid valve 58, if solely the first solenoid valve 56 is powered, then the latter switches and connects its first input 60 to its output 72. System pressure appears in the connecting line 80, however, the second non-return valve 82 prevents an inflow of fluid to the piston chamber 48. The return flow from the piston chamber to the storage container via 86, 84, 82, 80, 72 is blocked in this state. However, there is pressure at the input 78 of the second solenoid valve 58 due to internal leakage of the solenoid valve 58 that leads to a small leakage flow into the piston chamber 48. This small amount of leakage is carried off by the open discharge valve 104 to the storage container 70, so that no pressure can build up in the piston chamber 48 that could lead to undesired disengaging of the parking brake. Thus, the engaged state of the parking brake also remains unchanged in this case.

However, if both solenoid valves 56, 58 are powered and switch from the illustrated unpowered position to their excited position, then the system pressure of the pressure supply line 66 is supplied to the piston chamber 48 by means of the input non-return valve 62, the first solenoid valve 56, the first non-return valve 76, and the second solenoid valve 58, and the piston 46 is moved against the force of the compression spring 50 and the main spring 42 is moved downwards. Here, the locking device 11 moves from its engaged position into its disengaged position. Due to the resulting fluid flow, the discharge valve 104 closes. With this piston position, the control pin 96 is pressed out of the annular groove 100 by the collar 102 of piston 46 and opens the leakage compensation valve 94, so that system pressure also develops in the piston chamber 48 by means of the connecting line 90, in which the pressure-maintaining non-return valve 88, the throttle 92, and the leakage compensation valve 94 are arranged.

For an excited (with power applied) second solenoid valve 58, if solely the first solenoid valve 56 is unpowered, then the latter switches and connects its second input 68 to its output 72. Now, the output 72 is connected to the storage container 70, but the first non-return valve 76 prevents a return flow of fluid out of the piston chamber 48. Furthermore, this [chamber] connects via the connecting line 90 to the pressure supply line 66. The disengaged state of the parking brake remains unchanged.

For an excited first solenoid valve 56, if just the second solenoid valve 58 is unpowered, then the latter switches and connects its second input 84 to its output 86. Due to the effect of the second non-return valve 82, an inflow of fluid from the pressure supply line 66 is now no longer possible to the piston chamber 68 [sic; 48]. However, the piston chamber 48 is further connected via the connecting line 90 to the pressure supply line 66. The disengaged state of the parking brake remains unchanged.

Independent of the position of the solenoid valves 56, 58, an outflow of fluid from the piston chamber 48 into the pressure supply line 66 is prevented by the input non-return valve 62, so that pressure built up in the piston chamber 48 is not reduced due to an unexpected drop in pressure in the pressure supply line 62. The pressure-maintaining non-return valve 88 prevents an outflow of fluid from the piston chamber 48 due to internal leakage of the first solenoid valve 56 from input 60 to input 68 and thus to storage container 70. In particular, for a drop in system pressure during driving, there can be residual leakage from piston chamber 48 to storage container 70, and this is due to internal leakage of the second solenoid valve 58 (from output 86 to input 84), the non-return valve 82, and internal leakage of the first solenoid valve 56 (from output 72 to input 68). This leakage is small due to an appropriate design of the solenoid valves 56, 58, such that even for higher oil temperatures (low viscosity), the pressure in the piston chamber can be maintained for approximately 10 min, and the parking brake does not become engaged.

If both solenoid valves 56, 58 are switched from their excited state to their unpowered state, then the piston chamber 48 is connected via the second solenoid valve 58, the second non-return valve 82, and the first solenoid valve 56 to the storage container 70, so that an outflow of fluid is achieved from the piston chamber 48 to the storage container 70. The throttle 92 limits the fluid flow through the connecting line 90, so that this is not sufficient to maintain the pressure in the piston chamber 48. The piston 46 migrates upwards, the control pin 96 slides into the annular groove 100, and the leakage compensation valve 94 closes, so that the subsequent fluid flow through the connecting line 90 is interrupted. The discharge valve 104 opens. Simultaneously, the locking device 11 engages the parking brake.

Thus, switching of the parking brake function (pressure charging or pressure relieving of the piston chamber) only occurs when both solenoid valves 56, 58 are switched in the same sense, thus when the control units 140, 142 send corresponding switching signals to the solenoid valves 56 and 58.

If there is no fault, then the main control unit 140 sends a power signal to activate the first solenoid valve 56, and the secondary control unit 142 sends a power signal to activate the second solenoid valve 58. If the drive lever 150 is brought to its park position, and the rotational speed of the output gear 10 detected by the rotational speed sensors 154, 168 to be below a predetermined value, then the power flow to the first solenoid valve 56 is interrupted by the main control unit 140. If the rotational speed of the output gear 10 detected by the rotational speed sensor 168 is below a predetermined value, then the power flow to the second solenoid valve 58 is also interrupted by the secondary control unit 140 [sic; 142].

Because the main control unit 140 and the secondary control unit 142 obtain independent rotational speed signals for the vehicle drive from the two rotational speed sensors 154 and 168, it can be reliably prevented (redundancy) that a defective control unit 140, 142 or a defective rotational speed sensor 154,168 could lead to an unintended parking brake engagement above a predetermined driving speed.

Through the direct voltage supply to the secondary control unit 142 from the battery, it is guaranteed that turning off the ignition while driving does not lead to engagement of the parking brake, because then the second solenoid valve 58 receives no signals to switch. The line 164 from the ignition key to the secondary control unit 142 serves solely as an alarm signal for the secondary control unit 142. The two control units 140,142 are connected by means of a communications BUS 174 that enables mutual monitoring.

The pressure sensor 106 supplies a return message about the actual parking brake position to the secondary control unit 142 at all times. Over an upper threshold (e.g., 15 bar), the parking brake is regarded as disengaged (unlocked), and under a lower threshold (e.g., 1 bar), the parking brake is regarded as engaged. The lower threshold usually lies below a pressure derived from the spring force of the compression spring 50 and the piston surface area of the piston 46, so that at first this value is not reached when the piston 46 is stopped in the engaged position, even when the mechanical rod assembly of the locking device 11 is blocked in the tooth-on-tooth position and (not) yet interlocked.

If emergency activation, e.g., for loss of parking brake function, is used for towing, and a diesel engine is used for operation (in order, e.g., to provide the supply pressure for the servo links and brakes), the main control unit or transmission control unit 140, receives via the position switch 128 and the rotary potentiometer 130 on the clutch pedal the request that the transmission shift into "neutral." The vehicle is thus prevented from operating, reliably and without the use of additional sensors, by means of a permanent manually disengaged parking brake. Thus, the position switch 128 and the rotary potentiometer 130 can be used both for transmission control and also for control of the emergency function.

FIG. 2 shows the time profile of the hydraulic pressure in the piston chamber 48, the piston stroke, and the signal of the pressure sensor 106 during uniform application of pressure and subsequent pressure release in the piston chamber 48 of the hydraulic cylinder of the parking brake.

In the output position, the solenoid valves 56, 58 connect the piston chamber 48 to the storage container 70, so that the pressure Pv of the storage container 70, which is usually zero, is created in piston chamber 48. At time t0 the solenoid valves 56, 58 switch and connect the piston chamber 48 to the hydraulic pump 64, so that the pressure in the piston chamber 48 rises up to the value of the system pressure Ps, which is achieved at time t3. The increase in pressure does not, in practice, have to follow the linear profile illustrated. At time t4, the solenoid valves 56, 58 are switched and now connect the piston chamber 48 to the storage container 70, so that the pressure in the piston chamber decreases back to the pressure Pv, which is achieved at time t5.

From the profile of the piston stroke illustrated in FIG. 2, it can be seen that at the beginning the piston 46 is completely retracted for the piston chamber pressure Pv, and it contacts a not-illustrated stop in the piston chamber 48. With rising pressure in the pressure chamber, the piston 46 initially does not change its position and remains in its retracted piston position KE. When the piston chamber pressure first reaches a value PE at time t1, which corresponds to the spring force acting on the piston 46 divided by the effective piston surface area, the piston 46 begins to extend in the direction of its unlocked position due to the increasing pressure in the piston chamber 48. At time t2, the completely extended piston position KA is achieved. At this point t2, the piston chamber pressure PA corresponds to the now maximum spring force acting on the piston 46 divided by the effective piston surface area. Further pressure increase has no effect on the piston position. The piston motion behaves in a corresponding manner for decreasing piston chamber pressure.

The sensor signal corresponds to the pressure in the piston chamber 48, however it exhibits a zero off set, so that at the beginning pressure Pv it assumes the value S0, which can be, e.g., 0.5 V. The sensor signal is characterized by two thresholds. The first, lower threshold S1, is characterized by a piston chamber pressure that is greater than the pressure Pv of the storage container 70, but that is less than the pressure P1 at time t1, which corresponds to the ratio of the residual force (spring tension) of the spring 50 acting on the piston 46 to the effective piston surface area. Preferably, the first threshold S1 lies between 40% and 80% of the pressure value corresponding to the residual force. If the pressure on the piston stop is, e.g., P1=2 bar, then the first threshold can correspond to a pressure of approximately 0.8 and 1.2 bar.

The second, upper threshold S2 is characterized by a piston chamber pressure P2 that is greater than the piston chamber pressure at time t2, but that is less than the system pressure Ps. The piston chamber pressure PA at time t2 is equal to the ratio of the maximum spring force of the springs 42 and 50 acting on the maximally disengaged piston 46 and the effective piston surface area. Preferably, the second threshold S2 is between 40% and 80% of the supply pressure or system pressure Ps. For a system pressure of Ps=20 bar, the second threshold is preferably between 14 and 17 bar.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A control system for a motor vehicle parking lock, the parking lock having a gear with a plurality of teeth separated by a plurality of grooves, and a detent member movable to a disengaged position spaced apart from the gear, to an engaged position wherein the detent member is received by one of the grooves and to a tooth-on-tooth position wherein the detent member engages an outer end surface of one of the teeth, the control system comprising:

an actuator for moving the detent member;

a control circuit for controlling the actuator;

a sensor for sensing a parameter of the control circuit and generating a signal representing said parameter; and a control unit for evaluating the signal from the sensor and generating a status signal indicative of the engagement status of the parking lock, the control unit generating a parking lock disengaged status signal when the detent member is in its disengaged position, the control unit generating a parking lock engaged status signal when the detent member is in the engaged and tooth-on-tooth positions.

2. The parking lock control system according to claim 1, wherein:

the actuator comprises a hydraulic piston which is coupled to the detent member and which is responsive to pressure forces.

3. The parking lock control system of claim 2, wherein:

a spring urges the piston in opposition to the pressure in a chamber of the piston.

4. The parking lock control system of claim 2, further comprising:

a linkage coupled between the piston and the detent member; and a main spring coupled to the linkage, the main spring urging the linkage towards a locked position and indirectly urging the hydraulic piston towards an unpressurized position.

5. The parking lock control system of claim 2, wherein:

the hydraulic piston is forced by a spring towards an unpressurized stop position; and the control unit defines a first predetermined pressure threshold which corresponds to the engaged state of the parking brake, and defines a second, predetermined pressure threshold which corresponds to the disengaged state of the parking brake, the second pressure threshold corresponds to a value that is between a piston pressure which corresponds to a maximum force of the spring in a disengaged position of the piston and a system pressure provided by the control circuit.

6. The parking lock control system of claim 5, wherein:

the second pressure threshold corresponds to a value between 60% and 90% of the system pressure.

7. The parking lock control system of claim 2, wherein:

the sensor comprises a pressure sensor which supplies a signal which is greater than zero when a chamber of the piston is unpressurized.

* * * * *